Dec. 7, 1954   G. V. WOODY   2,696,351
ROLLER MILL FEED AND ROLL POSITIONING CONTROL APPARATUS
Filed July 13, 1950
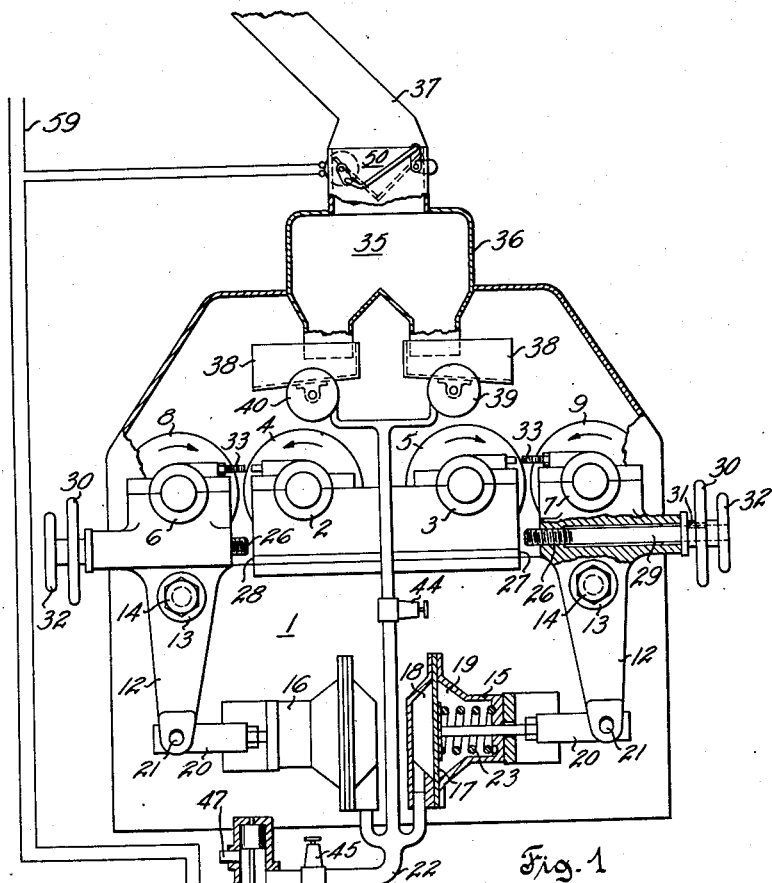
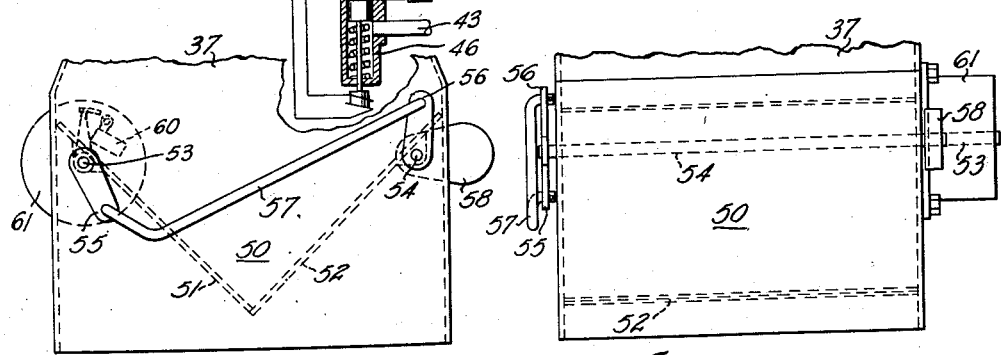
Fig. 1
Fig. 2   Fig. 3
Inventor
Guy V. Woody
by Arthur M. Strich
Attorney

United States Patent Office 2,696,351
Patented Dec. 7, 1954

2,696,351

ROLLER MILL FEED AND ROLL POSITIONING CONTROL APPARATUS

Guy V. Woody, Milwaukee, Wis., assignor to Allis-Chalmers Manufacturing Company, Milwaukee, Wis.

Application July 13, 1950, Serial No. 173,600

4 Claims. (Cl. 241—37)

The present invention relates to the improvement of material comminuting devices of the roller mill type.

In industry in general, and particularly in the art of grinding grain for the making of flour, frequent use is made of comminuting devices of the roller mill type. These roller mills generally comprise one or more pairs of rollers acting together upon material passed between them. To simplify the mill structure, one of the rollers of the pair is usually mounted to rotate about a fixed axis while the other roller is supported by bearings movable in planes perpendicular to the axis of rotation of the stationary roll. The movable roll is urged into the grinding position by some means such as spring or fluid pressure actuated leverages. The action of springs and fluid pressures are often combined so that the movable roll will be moved into grinding position but will yield to crushing pressures beyond a predetermined maximum which is determined by the nature of the crushing operation being performed. Feed delivering means are mounted above the grinding rolls and sometimes include a hopper with motor driven means for evenly distributing the proper amount of material between the rolls.

In the flour milling art the cylindrical surfaces of the grinding rolls are usually corrugated and the rolls rotated at different speeds. The rolls must not come in contact with each other. The thin veil of grain passing between the rolls prevents the corrugations on the rolls making contact with each other. Considerable damage has been done to corrugated rolls due to interruptions in the flow of feed to the rolls and consequent metal to metal contact of the rolls without the immediate knowledge of the mill operator. By the time the operator can act to disengage the rolls the damage is done, and it is often necessary to shut down the mill to replace the damaged rolls with newly corrugated ones. It is then necessary to grind the corrugations off the roll so damaged and recorrugate them. This results in considerable expense, but probably does not represent as much money as would be lost by the miller who would try to make flour with the damaged rolls.

The provision of a hopper with a motor driven vibratory feeder in the feed delivering means for evenly distributing the proper amount of feed material between the rolls helped to lessen but did not eliminate the danger of the rolls making contact with each other. The hopper provided a means for temporarily storing feed material and delivering the material at a nearly constant rate to the grinding rolls even though the flow of feed material to the hopper was not at a constant rate. However, the capacity of the hopper is necessarily limited and may become empty or if the feed in the hopper becomes too low, the feed will not be evenly distributed between the rolls and may be ejected from the feeder with such force that it will pass over the rolls instead of dropping between the rolls and thereby allowing the rolls to contact each other with the resulting damage to their corrugated surfaces. Since the provision of a hopper and vibratory feeder did not completely eliminate the danger of damage to the rolls, mechanisms were devised to disengage the roll positioning means, causing the rolls to part and the feeder motor to stop when the flow of feed material was interrupted or the level in the feed hopper became too low. The problem of preventing metal to metal contact of the rolls was thus solved, but in the solution another problem was created. If the flow of feed to the mill is interrupted these operating mechanisms will disengage, thereby stopping the machine, even though the interruption may have been for a very brief period. It is then necessary for the operating personnel to start the feeder motor and reengage the roll positioning mechanism before the mill can resume the grinding operation. This calls for the constant attention of the operating personnel and requires an undersirable number of operators if the maximum operating time is to be maintained by each machine. The present invention provides a novel control mechanism for a roller mill that will stop the operation of the feeder motor and cause the grinding rolls to move relatively away from each other if the flow of feed material to the mill is interrupted and automatically start the operation of the feeder motor and cause the grinding rolls to move relatively toward each other to a grinding position immediately upon flow of sufficient feed material to the mill to prevent metal to metal contact of the grinding rolls.

The principal object of this invention is therefore to provide a new and improved material comminuting device of the roller mill type in which the grinding rolls will part upon any interruption in the flow of feed material and remain apart until the flow of feed material becomes sufficient to prevent metal to metal contact of the grinding rolls, at which time the rolls will immediately and automatically move back together again.

Another object of the invention is to provide devices which when applied to a roller mill having vibratory feeder means to evenly distribute the feed material between the grinding rolls, will cause the vibratory feeder means to operate only if the flow of feed material to the mill is sufficient to cause the grinding rolls to move together, with sufficient feed material being available to be directed between the rolls to prevent metal to metal contact of the rolls.

A further object of this invention is to provide a roller mill in which the grinding rolls cannot be accidentally caused to move together if feed material is not available to flow between the rolls and prevent metal to metal contact of the grinding rolls.

Objects and advantages other than those above set forth will be apparent as the description of the invention proceeds.

The novel features of the invention and how the objects are attained will appear from the specification and the accompanying drawing showing an embodiment of the invention and forming a part of this application, and all of these features are intended to be pointed out in the claims.

In the drawings:

Fig. 1 is a fragmentary end view of a roller mill frame with grinding rolls journaled in fixed and movable bearings, equipped with roll positioning and pressure controlling means, feed delivering means, feed control means in the feed delivering means, piping and wiring shown schematically, according to the invention, and parts being shown in cross section to illustrate internal construction;

Fig. 2 is an end view of the feed control means mounted in the feed delivering means as shown in Fig. 1 but to an enlarged scale; and Fig. 3 is a side view of the enlarged structure shown in Fig. 2, as viewed from the right of Fig. 2.

The roller mill illustrated in the drawing includes a conventional type frame provided with two pairs of fixed, and two pairs of relatively movable bearing supports for carrying two pairs of cooperating grinding rolls. Each of the rolls is rotatable in its supporting bearings and the rotational axes of all of the rolls are parallel to each other. The rolls supported by the fixed bearings shall hereinafter be referred to as "stationary rolls" and the rolls supported by the movable bearings shall be referred to as "movable rolls." Each of the movable rolls will be arranged to rotate at a different speed and in the opposite direction of the rotation of the stationary roll with which it cooperates. The bearing supports carrying the movable rolls are oscillatable in planes perpendicular to the axis of rotation of the stationary rolls established by their respective fixed bearing supports, to increase or decrease the spacing between the cylindrical surfaces of the cooperating grinding rolls. An example of these conventional mill features may be found in U. S. Patent No. 447,765. The roll positioning devices shown and hereinafter described in somewhat greater detail are further described and claimed in the applicant's copending application Serial No. 91,890, filed May 7, 1949.

Referring now specifically to Fig. 1, the roller mill is shown as comprising a frame 1 with pairs of fixed bearing supports 2 and 3 in which are journaled two stationary rolls 4 and 5. Bearings 6 and 7 are provided to support movable rolls 8 and 9 in parallel alignment with their cooperating stationary rolls 4 and 5. The bearings 6 and 7 form a part of levers 12 which are pivotable about eccentric sleeves 13 secured to the frame 1 by bolts 14. The rolls 4, 5 and 8, 9 are rotated in any manner desired (not shown) in the direction indicated by the arrows. The rolls 4, 5 and 8, 9 may be driven by an arrangement of chains and gears but an actual showing of a driving arrangement is omitted in the interest of simplifying the drawing.

Elastic fluid operable positioning means are provided to oscillate the levers 12 about the sleeves 13 to move the movable grinding rolls 8 and 9 toward or away from their cooperating stationary rolls 4 and 5. The positioning means provided are a pair of pneumatic motors 15, 16, one of which is shown in cross section. The casing of the motor 15 is shown divided by a flexible diaphragm 17 into two chambers 18 and 19. A connecting rod 20 is attached on one end to the diaphragm 17 with the other end of the connecting rod 20 being connected to the lever 12 by any suitable device, such as a pin and slot connection 21. Chamber 18 is connected to a conduit 22 for the supply and exhaust of pneumatic fluid. In chamber 19 a compression spring 23 is arranged to thrust diaphragm 17 in a direction to reduce the volume of chamber 18 and pull connecting rod 20 in the direction that will move the movable roll 9 away from the stationary roll 5. Exertion of sufficient fluid pressure in the chamber 18 will overcome the force of the spring 23 on diaphragm 17 and connecting rod 20 will move roll 9 toward stationary roll 5.

Adjustable stop means are provided to limit the travel of the movable rolls 8 and 9 in the direction of their cooperating stationary rolls 4 and 5. The cylindrical surfaces of the grinding rolls are corrugated and are kept from making damaging metal to metal contact by the feed material passing between the cooperating rolls. If the movable rolls 8 and 9 were allowed to move toward the stationary rolls 4 and 5 with no means other than the stationary rolls themselves to limit travel in that direction, the impact of the movable rolls swinging against the stationary rolls might be sufficient to damage the corrugations even though the feed material insulated the rolls from actual metal to metal contact. The adjustable stop means are shown as comprising a threaded bore 26 through each of the levers 12 above the pivotal axis of the sleeves 13 and preferably perpendicular to the abutting surfaces 27, 28 of the fixed bearing supports 2, 3. In the bore 26 of each of the levers 12, an adjusting screw 29 is threadedly engaged in such manner that one end may project to a varying degree in the direction of the abutting surfaces 27, 28. The opposite end of screw 29 is arranged to extend beyond levers 12 and on this end an adjusting wheel 30 may be mounted and angularly fixed by a key 31, with a lock nut 32 threadedly engaged with the screw 29. Rotating the screw 29 will cause its inner end to protrude more or less from the levers 12 in such manner that movement of the levers 12 toward the abutting surfaces 27, 28 will be arrested by contact of the screw 29 at varying positions, dependent on the adjustment of the screw. The screw 29 can thereby be adjusted to allow the corrugated surfaces of the rolls to approach sufficiently to effect the desired grinding action and yet prevent the rolls banging together with sufficient force to damage the corrugations even though the rolls are insulated from metal to metal contact by the material being ground. Additional safety stop screws 33 may be provided to prevent damage to the corrugations in case of improper adjustment of screws 29.

Feed delivering means 35 are mounted above the grinding rolls and are arranged to direct the material to be ground between the cooperating rolls 4, 8 and 5, 9. The feed delivery means include a hopper 36 arranged to receive the feed material from a delivery spout 37. A pair of vibratory feeders 38 are arranged to direct the flow of feed from the hopper 36 to the grinding rolls. The vibratory feeders 38 are driven by elastic fluid operated means here shown as the pneumatic motors 39 and 40.

Elastic fluid under pressure, for operating the roll positioning motors 15, 16 and the feeder motors 39, 40, is delivered to the motors by conduit 22 connected to a conduit 43 from a source of operating fluid under a pressure somewhat higher than that needed to operate the motors 15, 16 and 39, 40. Conventional pressure reducing or regulating valves 44, 45 are provided in the conduit 22 to control the pressure required to operate the motors 15, 16 and 39, 40. The feeder motors 39, 40 are capable of operating at less pressure than is required to overcome the force of the springs 23 in the roll positioning motors 15, 16. This will insure feed material being fed between the grinding rolls before the grinding rolls have been moved together, to provide sufficient feed between the rolls when they do move together to prevent metal to metal contact of the rolls. Fluid admission control means are provided to regulate the operation of motors 15, 16 and 39, 40 and as shown comprise a solenoid valve 46 of conventional design, capable of selectively venting the conduit 22 to the atmosphere through the vent pipe 47, or connecting conduit 22 with conduit 43 to operate motors 15, 16 and 39, 40.

Feed control means comprising normally closed gate means 50 are provided in the feed delivering means 35 (see also Fig. 2 and Fig. 3) and are arranged to operate the solenoid valve 46 and make the operation of the motors 15, 16 and 39, 40 responsive to opening motion of the gate means. The gate means are shown as comprising flaps 51, 52 attached to rotatable shafts 53, 54. Crank arms 55, 56 are attached to one end of each of the shafts 53, 54, and are connected by a connecting link 57 in a manner causing both of the flaps 51, 52 to move if either flap moves in an opening or closing direction. A closing arm 58 is attached to the opposite end of shaft 54 with its center of mass concentrated at a point a distance from the rotatable axis of the shaft to exert a moment of force upon the shaft to normally hold the flaps 51, 52 in a closed position. The weight of the arm 58 and the moment acting upon the shaft 54 to hold the flaps 51, 52 closed must be sufficient to hold the flaps in a closed position until the amount of feed material deposited thereon from the feed spout 37 is sufficient to insulate the grinding rolls 4, 8 and 5, 9 from metal to metal contact. The control of the solenoid valve 46 by the gate means 50 is accomplished by providing switch means in a circuit 59 provided to energize the solenoid valve 46. The switch means may be, as shown, a conventional rotary explosion proof switch 60 within a casing 61, with the switch mounted to be closed by the rotation of shaft 53 when flap 51 swings to an open position.

In the operation of the described roller mill with no feed material flowing through the feed spout 37, the flaps 51, 52 will be held in a closed position by the arm 58. The switch 60 will then be in open position and solenoid valve 46 will be in its normal closed position. As long as the flaps 51, 52 remain closed the springs 23 will hold the movable rolls 8, 9 away from their cooperating stationary rolls 4, 5. If then, feed material begins to flow through the spout 37 the feed will be caught by the flaps 51, 52. When the weight of feed upon the flaps 51, 52 reaches the predetermined minimum necessary to insure sufficient feed being directed between the rolls to insulate them from damaging metal to metal contact, the flaps will open and rotate shaft 53 to close switch 60. When switch 60 is closed solenoid switch 46 will open and admit operating fluid to the roll positioning motors 15, 16 and the feeder motors 39, 40. This will cause the vibratory feeders 38 to direct feed between the grinding rolls. When the pressure in chamber 18 of the motors 15, 16 becomes sufficient to compress the springs 23, the movable rolls 8, 9 will be moved toward their cooperating stationary rolls 4, 5 and the feed will be ground as it passes between the rolls. If then for any reason the flow of feed through spout 37 is interrupted, flaps 51, 52 will swing to a closed position, rotating shaft 53 to open switch 60. This will deenergize solenoid switch 46 and it will close and vent conduit 22 to the atmosphere through vent pipe 47. As the fluid pressure in chamber 18 of the motors 15, 16 is vented through conduit 22 and vent pipe 47, the springs 23 will cause movable rolls 8, 9 to move away from their cooperating stationary rolls 4, 5. The closing of solenoid valve 46 will also stop feeder motors 39, 40. The mill will remain inoperative until such time as the flow of feed through spout 37 again becomes sufficient to force open flaps 51, 52 and initiate the grinding operation of the mill. Since the rolls will part quickly and the feeder motors stop almost immediately, the level of feed in the hopper 36 will never lower to a point that would impair the action of the vibratory feeders directing the feed properly between the rolls. The grinding rolls may be driven at all times for when parted no damage will occur to the rolls, rotating or not rotating, and further if the rolls are driven to rotate at all times the mill can start and stop the grinding operation as dictated by the flow of feed to the machine and no attention need be paid to the machine itself by the operating personnel.

From the foregoing it will be apparent to those skilled in the art that the illustrated embodiment of the invention provides a new and improved material comminuting device of the roller mill type and, accordingly, accomplishes the objects of the invention. On the other hand, it will also be obvious to those skilled in this art that the illustrative embodiment of the invention may be variously changed and modified, or features thereof, singly or collectively embodied in other combinations than illustrated, without departing from the spirit of the invention, or sacrificing all of the advantages thereof, and that accordingly the disclosure herein is illustrative only, and the invention is not limited thereto.

It is claimed and desired to secure by Letters Patent:

1. In a roller mill: a pair of rolls cooperable to grind material fed therebetween; means for mounting said rolls for relative lateral movement toward and away from each other; feed delivering means mounted above said rolls, said feed delivering means including gate means operable to open in response to a predetermined flow of material to be ground and operable to close in response to a lesser flow of material to be ground; a motor driven feeder cooperable with said feed delivering means and operative to direct a flow of material to be ground between said rolls; biasing means for urging relative lateral movement of said rolls away from each other; motive means operable to oppose the bias of said biasing means for moving said rolls relatively toward each other to a grinding position; energizing means for operating said motor driven feeder and said motive means, solenoid operated control means associated with said energizing means; an electric circuit for energizing said solenoid operated control means; and switch means in said circuit responsive to a predetermined opening of said gate means to cause said feeder to be energized and cause said motive means to be energized to operate to oppose the bias of said biasing means and move said rolls relatively toward each other to a grinding position, and said switch means vice versa responsive to a predetermined closing of said gate means to cause said feeder to be deenergized and said motive means deenergized and cause said biasing means to move said rolls relatively away from each other.

2. In a roller mill: a pair of rolls cooperable to grind material fed therebetween; means for mounting said rolls for relative lateral movement toward and away from each other; feed delivering means mounted above said rolls, said feed delivering means including gate means operable to open in response to a predetermined flow of material to be ground and operable to close in response to a lesser flow of material to be ground; a fluid motor driven feeder cooperable with said feed delivering means and operative to direct a flow of material to be ground between said rolls; biasing means for urging relative lateral movement of said rolls away from each other; fluid operated motive means operable to oppose the bias of said biasing means for moving said rolls relatively toward each other to a grinding position; conduit means for supplying energizing motive fluid to said feeder and said motive means; and control means associated with said conduit means, said control means responsive to a predetermined opening of said gate means to start said feeder and cause said motive means to operate to oppose the bias of said biasing means to move said rolls relatively toward each other to a grinding position, and said control means vice versa responsive to a predetermined closing of said gate means to stop said feeder and make said motive means inoperative and cause said biasing means to move said rolls relatively away from each other.

3. In a roller mill: a pair of rolls cooperable to grind material fed therebetween; means for mounting said rolls for relative lateral movement toward and away from each other; feed delivering means mounted above said rolls, said feed delivering means including gate means operable to open in response to a predetermined flow of material to be ground and operable to close in response to a lesser flow of material to be ground; a fluid motor driven feeder cooperable with said feed delivering means and operative to direct a flow of material to be ground between said rolls; biasing means for urging relative lateral movement of said rolls away from each other; fluid operated motive means operable to oppose the bias of said biasing means for moving said rolls relatively toward each other to a grinding position; conduit means for supplying energizing motive fluid to said feeder and said motive means; solenoid operated control valve means associated with said conduit means; an electric circuit for energizing said solenoid operated control valve means; and switch means in said circuit responsive to a predetermined opening of said gate means to cause said feeder to be energized and cause said motive means to be energized to operate to oppose the bias of said biasing means and move said rolls relatively toward each other to a grinding position, and said switch means vice versa responsive to a predetermined closing of said gate means to cause said feeder to be deenergized and said motive means deenergized and cause said biasing means to move said rolls relatively away from each other.

4. In a roller mill: a pair of rolls cooperable to grind material fed therebetween; means for mounting said rolls for relative lateral movement toward and away from each other; feed delivering means mounted above said rolls, said feed delivering means including gate means operable to open in response to a predetermined flow of material to be ground and operable to close in response to a lesser flow of material to be ground; an elastic fluid motor driven feeder cooperable with said feed delivering means and operative to direct a flow of material to be ground between said rolls; biasing means for urging relative lateral movement of said rolls away from each other; elastic fluid operated motive means operable to oppose the bias of said biasing means for moving said rolls relatively toward each other to a grinding position; conduit means for supplying energizing motive fluid to said feeder and said motive means; solenoid operated valve means for controlling admission of motive fluid to said conduit means; an electric circuit for energizing said solenoid operated valve means; switch means in said circuit for controlling the energization of said solenoid operated valve means, said switch means responsive to a predetermined opening of said gate means to cause said feeder to be energized and cause said motive means to be energized to operate to oppose the bias of said biasing means and move said rolls relatively toward each other to a grinding position; and bleeding means operatively associated with said solenoid operated valve means responsive to a predetermined closing of said gate means for bleeding energizing motive fluid from said feeder and said motive means to stop said feeder and make said motive means inoperative to cause said biasing means to move said rolls relatively away from each other.

References Cited in the file of this patent

UNITED STATES PATENTS

| Number | Name | Date |
| --- | --- | --- |
| 236,643 | Stevens | Jan. 11, 1881 |
| 294,418 | Wegmann | Mar. 4, 1884 |
| 361,416 | Holgate | Apr. 19, 1887 |
| 811,574 | Nikolai | Feb. 6, 1906 |
| 844,350 | Hale | Feb. 19, 1907 |
| 1,648,680 | Given | Nov. 8, 1927 |
| 1,925,881 | Rhea | Sept. 5, 1933 |
| 2,138,397 | Cannity | Nov. 29, 1938 |

(Other references on following page)

UNITED STATES PATENTS

| Number | Name | Date |
|---|---|---|
| 2,174,843 | Roth | Oct. 3, 1939 |
| 2,182,900 | McIlvried | Dec. 12, 1939 |
| 2,312,726 | Munio | Mar. 2, 1943 |
| 2,351,534 | Norcross | June 13, 1944 |
| 2,456,074 | Newhouse | Dec. 14, 1948 |
| 2,545,921 | Goodwillie | Mar. 20, 1951 |

FOREIGN PATENTS

| Number | Country | Date |
|---|---|---|
| 410,967 | Great Britain | May 31, 1934 |
| 542,882 | Great Britain | Jan. 30, 1942 |
| 582,423 | Germany | Aug. 15, 1933 |
| 632,719 | Great Britain | Dec. 5, 1949 |